United States Patent [19]
Tambert et al.
[11] 3,798,598
[45] Mar. 19, 1974

[54] DATA COUPLING APPARATUS FOR DEDICATED COMMUNICATION LINES

[75] Inventors: John Tambert, Rochester; Stanley J. Zurakowski, Fairport; Charles L. Jacobson, Pittsford, all of N.Y.

[73] Assignee: Xerox Corporation, Stamford, Conn.

[22] Filed: July 23, 1971

[21] Appl. No.: 165,455

[52] U.S. Cl. .............. 340/147 R, 178/2 R, 179/2 R
[51] Int. Cl. ....................... H04l 15/00, H04m 11/06
[58] Field of Search .......... 340/147; 179/2 DP, 2 C, 179/2 A, 4; 178/5.4 MC, 2, 3, 4

[56] References Cited

UNITED STATES PATENTS

| | | | |
|---|---|---|---|
| 3,427,588 | 2/1969 | Mauzey et al. | 340/147 R |
| 3,524,935 | 8/1970 | Gonsewski et al. | 179/2 DP |
| 3,549,809 | 12/1970 | Stehr | 179/2 DP |
| 3,571,798 | 3/1971 | Dawson | 178/3 |
| 3,586,778 | 6/1971 | Riethmeier | 179/2 C |
| 3,588,320 | 6/1971 | Guzak, Jr. | 178/2 R |
| 3,639,904 | 2/1972 | Arulpragasam | 340/147 R |
| 3,655,915 | 4/1972 | Liberman et al. | 179/2 DP |

*Primary Examiner*—Donald J. Yusko

[57] ABSTRACT

Data coupling apparatus for establishing a data communication path between a local data device and a remote data device over an existing communication channel. The capability of each of the local data device and the remote data device to receive data is detected; and when data is transmitted by the remote data device the local data device is automatically enabled to receive said transmitted data. If the local data device is adapted to transmit data, the data coupling apparatus initiates a data transmission when the remote data device is detected as being capable of receiving data. At the conclusion of a data transmission or reception, the data coupling apparatus terminates further operation of the local data device.

11 Claims, 3 Drawing Figures

INVENTORS
John Tambert
Stanley J. Zurakowski
Charles L. Jacobson
BY Marn & Jangarathis
ATTORNEYS INVENTORS
John Tamberf
Stanley J. Zurakowski
Charles L. Jacobson
BY
Marn & Jangarathis
ATTORNEYS

DATA COUPLING APPARATUS FOR DEDICATED COMMUNICATION LINES

This invention relates to data coupling apparatus and more particularly, to data coupling apparatus that permits automatic control of a local data device by a remote data device coupled thereto over an existing communication channel.

In the data communication art, it has been found that, in many instances, the amount of useful information that is transmitted between two stations is sufficient to justify a permanent, constantly available communication channel to exist therebetween. In other instances, where data is sporadically transmitted temporary communication channels may be provided between a transmitting and a receiving station. Typical examples of the latter include: time sharing digital computer systems where access to a central computer is apportioned among subscribers and subscribers need be coupled to the central computer only when a data transfer is effected, i.e., at infrequent intervals of time; radio and television systems where receiver stations are selectively coupled to a transmitter station via a space link and electrical conducting means are not interconnected therebetween; and facsimile transmission systems where facsimile transceivers are interconnected through a public telephone system by conventionally dialling an appropriate telephone number and the facsimile transceivers are coupled to the telephone system once a telephonic connection is obtained. Data coupling apparatus that has been successfully utilized for data communication over a temporary communication channel, such as a conventional public telephone system, is disclosed in detail in U.S. Pat. Application Ser. No. 165684 filed on July 23, 1971 now U.S. Pat. No. 3,739,338, and assigned to Xerox Corporation, the assignee of the present invention. Although such data coupling apparatus is advantageously utilized to automatically control the operation of a data device coupled thereto when a communication channel is effected through a telephone switching network, various features and operating characteristics of said data coupling apparatus are not necessary when data is transmitted to a data device over a permanent, constantly available communication channel.

It is advantageous to provide a permanent communication channel between installations that propose to transmit large amounts of data therebetween. The cost of utilizing the public telephone system for each data transmission is manifested in the toll rates thereof, which may exceed the cost of establishing suitable electrical conducting means between such installations. Moreover, the electrical conductors, which may be coaxial cables, or the like, may be designed with improved data transmission characteristics in contradistinction to the transmission characteristics inherent in a public telephone system. Telephone operating companies are aware of the foregoing disadvantages attendant with "bulk" data transmission over conventional telephone switching systems and, therefore, have provided permanent communication channels between numerous geographic locations. These permanent communication channels are commonly known as "leased" telephone lines and are independent of the conventional telephone system switching equipment. Hence, subscribers to leased telephone lines are furnished with a constantly available communication channel between their respective stations, which communication channel is dedicated for use by the subscribers thereto only. Consequently, information may be transmitted by such subscribers without the prerequisite dialling, ringing and answering of telephone instruments as heretofore required by the dictates of a public telephone system.

Nevertheless, the transmission characteristics of leased telephone lines are similar to the transmission characteristics of public telephone lines, notwithstanding the omission of switching equipment therein. Accordingly, if the leased telephone line is to be employed for the transmission of data, such as digital data, facsimile information, or the like, it is necessary to modify the data device that is to be utilized therewith in a manner that is responsive to the transmission characteristics of the leased telephone lines. It is readily apparent that various data devices that are now commercially available have not been specifically designed for use with a leased telephone line. It is preferable therefore, to employ an interfacing arrangement between the data device and the leased telephone line to facilitate the transmission of data to and from the data device thereover. It is also desirable to provide for automatic operation of the data device, without the assistance of an operator, such that data may be transmitted to the data device at any time. Moreover, the added capability of the interfacing arrangement for manual operation thereof enables an operator to control the operation of the data device and also allows for conventional use of the leased telephone line for the transmission of verbal messages as well as the transmission of data thereover. This invention is drawn to data coupling apparatus to be utilizing in conjunction with a conventional data device for the transmission of data over a permanent, constantly available communication channel. It will become clear from the forthcoming teachings herein, that this invention is not limited solely for use with a leased telephone line. It is contemplated that any communication channel, such as an electrical twin lead conductor, a coaxial cable, a space communication channel, or the like may be employed herewith.

Therefore, it is an object of the present invention to provide data coupling apparatus for connecting a data device to a communication channel.

It is another object of the present invention to provide data coupling apparatus for transmitting and receiving data over a constantly available communication channel.

A further object of the instant invention is to provide apparatus for use with a data device whereby said data device is adapted to receive data automatically or manually.

An additional object of this invention is to provide a data coupling device that enables the reception of data by a data device in response to remotely transmitted data.

It is another object of the present invention to provide apparatus for use with a data device and a constantly available communication channel for controlling the operation of said data device whereby data is transmitted and received by said data device.

Still another object of this invention is to provide apparatus admitting of an automatic mode of operation whereby data is selectively received by a data device in response to a signal transmitted by a remote device.

A still further object of this invention is to provide data coupling apparatus that enables data communication with an attended or unattended data device.

Various other objects and advantages of the invention will become clear from the following detailed description of an exemplary embodiment thereof and the novel features will be particularly pointed out in connection with the appended claims.

In accordance with this invention, data coupling apparatus is provided for establishing a data transmission or data reception between a local data device and a remote data device over an existing communication channel wherein status detecting means detects the capability of said local data device and said remote data device to selectively transmit and receive data; enable means enables the local data device to automatically receive data in an unattended mode of operation when data is transmitted by the remote data device and enables the local data device to transmit data when said remote data device is capable of receiving data, said enable means being operable in accordance with the capabilities detected by said status detecting means; and said enable means disables said local data device from further operation upon the completion of a data transmission or data reception, whereby said data coupling apparatus is prepared for establishing a subsequent data transmission or data reception.

The invention will be more clearly understood by reference to the following detailed description of an exemplary embodiment therof in conjunction with the accompanying drawings in which.

Figure 1:
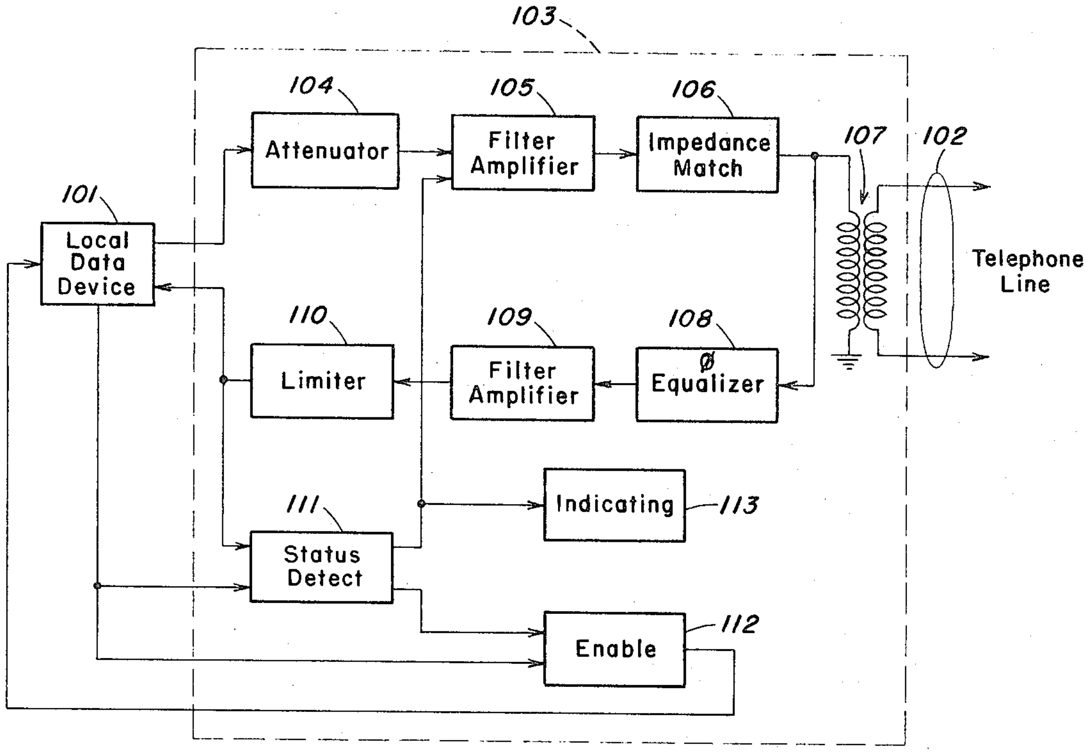
FIG. 1 is a block diagram of the present invention in combination with a data device and an existing communication channel.

Referring now to the drawings, and in particular to FIG. 1, there is illustrated a block diagram of the present invention comprised of local data device 101, an existing communication channel 102 and data coupling apparatus 103. Local data device 101 may comprise a conventional data producing device such as a keyboard device, a punched card reader, an optical reader, a facsimile transmitter or the like. Alternatively, local data device 101 may comprise a typical read-out device such as a keyboard printer, a line printer, a tape recorder, a cathode ray tube viewing device, or a facsimile receiver. It should be recognized that the local data device 101 may comprise a data transceiver capable of transmitting and receiving data signals. For purposes of explanation, local data device 101 may be assumed to comprise a facsimile transceiver such as a Telecopier II or Telecopier III manufactured by Xerox Corporation and adapted to selectively transmit or receive facsimile information.

The existing communication channel 102 may comprise a conventional data link such as twin electrical conducting leads, coaxial cable, a radio wave antenna, a leased telephone line, or the like. For the purpose of facilitating a ready understanding of the instant invention, the existing communication channel 102 may be assumed to comprise a leased telephone line. It will, of course, be appreciated that the present invention is not limited solely to applications incorporating leased telephone lines. It should be recognized that data that is transmitted over the leased telephone lines 102 is modulated by a suitable modulator included in local data device 101. Conversely, data that is received over leased telephone lines 102 is demodulated by a suitable demodulator included in local data device 101.

Data coupling apparatus 103 is interposed between local data device 101 and leased telephone lines 102. Data coupling apparatus 103 is adapted to provide a communication path between local data device 101 and a remote data device, not shown, coupled to leased telephone lines 102 and to control the operation of local data device 101 such that data signals may be transmitted over leased telephone lines 102. Data coupling apparatus 103 is comprised of data transmit means for providing a transmission path between local data device 101 and leased telephone lines 102 and data receive means for providing a receiving path between leased telephone lines 102 and local data device 101. The data transmit means is comprised of attenuating means 104, filter-amplifying means 105 and impedance matching means 106. Attenuating means 104 is coupled to local data device 101 and may be comprised of a conventional attenuating device such as a resistance network or the like for attenuating the magnitude of the signals transmitted thereto by local data device 101 such that the transmitted signals are compatible with the amplitude characteristics of the leased telephone line. It is therefore recognized that attenuating means 104 may be omitted if the signals produced by local data device 101 admit of the proper magnitudes.

Attenuating means 104 is coupled to filter-amplifying means 105 which is adapted to shape the spectrum of the signals transmitted by local data device 101 in accordance with the signal requirements of the telephone system. For example, if local data device 101 transmits modulated data signals in the form of a modulated square wave, it is appreciated that the data signals include the odd harmonics of a fundamental sinusoidal wave. It should be noted that public telephone operating companies prohibit the transmission of higher harmonics over the facilities thereof. Filter-amplifying means 105 is effective to remove the higher harmonics and to transmit the fundamental sinusoid. Accordingly, filter-amplifying means 105 may comprise a conventional active filter or a combination of a low-pass filter coupled to a conventional amplifier. The output of filter-amplifying means 105 is coupled to impedance matching means 106 which is adapted to match the effective impedance of the data transmit means to the impedance of leased telephone lines 102. If the present invention is to be utilized with only a single type leased telephone line admitting of a predetermined length, impedance matching means 106 may be omitted. However, it is contemplated that the apparatus in accordance with the present invention finds ready application with various pre-existing communication channels. Accordingly, impedance matching means 106 is necessary to match the impedance of the particular communication channel utilized. Impedance matching means 106 is coupled to the primary coil of transformer 107, the secondary coil of which is coupled to leased telephone lines 102. The primary coil of transformer 107 is additionally coupled to a reference potential, such as ground, such that the transmitted and received data signals exhibit a common reference.

The data receive means is comprised of phase equalizing means 108, filter-amplifying means 109 and limiting means 110. An undesirable feature of conventional leased telephone lines is the intrinsic phase distorting characteristics thereof. The phase distortion attributed to the leased telephone line varies in a non-linear manner with respect to the frequency of the signal transmitted thereover. Phase equalizing means 108 is connected to the primary coil of transformer 107 and is adapted to compensate for the non-linear phase distorting characteristics by adding a compensating non-linear phase distortion to the signals supplied thereto. Thus, although the signals received over the leased telephone lines 102 will be subjected to a non-linear phase distortion, the signals supplied to filter amplifying means 109 are characterized in having a linear phase shift. Filter-amplifying means 109 is coupled to the output of phase equalizing means 108 and is similar to aforedescribed filter-amplifying means 105. Accordingly, filter-amplifying means 109 may comprise an active filter or a low-pass filter coupled to a conventional amplifier capable of eliminating unwanted noise from received data signals. In addition, filter-amplifying means 109 is coupled to local data device 101 via limiting means 110. Limiting means 110 may be comprised of a conventional limiting device, such as a conventional logarithmic amplifier, adapted to convert a signal admitting of sinusoidal characteristics to a signal admitting of rectangular wave shape. It should be understood that local data device 101 is adapted to operate upon rectangular wave signals.

The operation of the apparatus thus far described will now be explained. A communication channel available for the transmission of data is provided between the secondary coil of transformer 107 and a remote data device, not shown, by the leased telephone lines 102. If local data device 101 is comprised of a data transmitting device, or if the local data device is comprised of a data transceiver disposed in a transmit mode of operation, rectangular data signals transmitted thereby are reduced in magnitude by attenuating means 104. The odd harmonics of the data signals are removed by filter-amplifying means 105 and a substantially sinusoidal shaped waveform is applied to impedance matching means 106. The impedance matching means 106, which may comprise a series connected resistor, applies the sinusoidal shaped data signal across the primary coil of transformer 107. A corresponding data signal is induced across the secondary coil of transformer 107 and transmitted through leased telephone lines 102 to the remote data device. It is observed that the data signals applied across the primary coil of transformer 107 are capable of traversing phase equalizing means 108, filter-amplifying means 109, and limiting means 110. The transmitted data signals are thus returned to local data device 101. However, the returned data signals are not utilized by the internal circuitry of local data device 101 if said device admits of its transmit mode of operation.

If the local data device 101 is comprised of a data receiving device, or if the local data device is comprised of a data transceiver disposed in its receive mode of operation, data signals transmitted from the remote data device over leased telephone lines 102 are applied across the secondary coil of transformer 107. Corresponding data signals are induced across the primary coil of transformer 107 and applied to phase equalizing means 108. The non-linear phase distortion of the received data signals is compensated by phase equalizing means 108 and data signals admitting of a linear phase shift are applied to filter-amplifying means 109. It should be noted that if leased telephone lines 102 do not exhibit non-linear phase distortion characteristics, or if another appropriate communication channel is utilized, phase equalizing means 108 may be omitted. Filter-amplifying means 109 removes unwanted noise signals from the received data signals and shapes the waveform thereof to approximate a sinusoidal wave shape. Limiting means 110 converts the sinusoidal data signals to rectangular signals that are applied to local data device 101. The data signals transmitted and received by local data device 101 may be frequency modulated rectangular signals. Accordingly, a suitable modulator may be included in local data device 101 and coupled to attenuating means 104, and a suitable demodulator may be included in the local data device and coupled to limiting means 110.

The means included in data coupling apparatus 103 that is utilized to control the operation of local data device 101 is illustrated in block form as comprising status detecting means 111, enable means 112 and indicating means 113. Status detecting means 111 is coupled to local data device 101 and to limiter means 110, and is adapted to determine the capability of the local data device to receive data and to monitor a corresponding capability of the remote data device. Accordingly, status detecting means 111 may be supplied with signals generated by local data device 101 representing the particular operating mode thereof, i.e., a transmit mode whereby data is transmitted by the local data device or a receive mode whereby data is received by the local data device, and signals indicative of the satisfaction of specific conditions precedent for operation. In addition, local data device 101 may provide status detecting means 111 with a signal apprising said status detecting means of the occurrence of a transmit or receive operation. Furthermore, status detecting means 111 may be supplied with signals by limiter means 110. Status detecting means 111 is capable of generating output signals in accordance with the signals applied thereto, and includes outputs coupled to filter-amplifying means 105, enable means 112 and indicating means 113.

Enable means 112 is additionally coupled, at an input thereto, to local data device 101 and is adapted to enable the local data device to selectively transmit and receive data in accordance with the signals applied thereto. An output of enable means 112 is coupled to the local data device 101. The enable means includes means responsive to the completion of a data transmission to prevent further operation of the local data device until a subsequent transmission ensues.

Indicating means 113 is adapted to provide selected indications of the status of the local data device 101 and the remote data device, not shown. Hence, indicating means 113 may include visual indicating means, such as a lamp, or the like, capable of being selectively illuminated in response to the signals applied thereto by status detecting means 111.

In operation, local data device 101 is adapted to assume a data transmit mode and a data receive mode of operation in accordance with a desired function thereof. Also, the local data device, when in its receive mode of operation, may admit of a first quiescent state whereby said local data device exhibits a readiness to receive data. For the purpose of explanation, it will be assumed that the normal condition characterizing the operation of local data device 101 is the first quiescent state. When in its transmit mode of operation, the local data device 101 admits of a second quiescent state representative of the readiness thereof to transmit data. It should be appreciated that when the first or second quiescent state thereof obtains, the local data device is neither actively receiving nor actively transmitting data. However, the local data device 101 may be disposed in an active state representative of the effective reception or transmission of data thereby. Suitable circuitry, not a part per se of the present invention, is included in local data device 101 to produce corresponding signals as manifestations of the particular state and mode of operation assumed by the local data device.

Since the present invention is drawn to apparatus for enabling communication between local data device 101 and a remote data device, not shown, it will be appreciated that the remote data device is compatible with and may assume complementary states to the local data device. Accordingly, the remote data device may be identical to local data device 101 and thus is capable of assuming corresponding states and modes of operation. If local data device 101 is disposed in its receive mode of operation and the necessary conditions precedent to a data transmission are satisfied, status detecting means 111 is supplied with an appropriate signal indicating that the local data device admits of its first quiescent state and is in readiness to receive data. It may be assumed, therefore, that local data device 101 is not disposed in its active state. It will be further described hereinbelow that the quiescent and active states of local data device 101 are, in fact, mutually dependent such that the assumption of one necessarily precludes the other. Status detecting means 111 responds to the signal applied thereto to generate a first predetermined signal indicating that the local data device is capable of receiving data and effectively utilizing the received data.

The first predetermined signal is applied, in common, to indicating means 113 and to filter-amplifying means 105. Indicating means 113 is appropriately energized by the applied first predetermined signal to provide a suitable indication of the readiness of local data device to receive data. In addition, the first predetermined signal is shaped by filter-amplifying means 105, transmitted through impedance matching means 106 to the primary coil of transformer 107, whereat a corresponding signal is induced across the secondary coil of transformer 107 and transmitted to the remote data device by leased telephone lines 102. The remote data device is thus apprised of the readiness of local data device 101 to receive data. Let it be assumed that the remote data device is coupled to leased telephone lines 102 by data coupling apparatus identical to data coupling apparatus 103. Accordingly, if the remote data device admits of its first quiescent state, a second predetermined signal indicating that the remote data device is capable of receiving data is transmitted by the data coupling apparatus associated therewith over leased telephone lines 102 to the secondary coil of transformer 107. A corresponding signal is induced across the primary coil of transformer 107 and applied to phase equalizing means 108 whereat the non-linear phase distortion thereof is compensated. The compensated signal is then transmitted through filter-amplifying means 109 to limiting means 110 and thence to the local data device 101 and status detecting means 111. Local data device 101, admitting of its first quiescent state, does not respond to the received signal. However, status detecting means 111 is apprised of the capability of the remote data device to receive data.

Status detecting means 111 senses the received second predetermined signal and applies a signal indicative of the sensed second predetermined signal to indicating means 113. Indicating means 113 may be selectively adapted to provide an appropriate indication of the capability of the remote data device to receive data. It will soon be seen that, if desired, the first predetermined signal may be identical to the second predetermined signal. Hence, status detecting means 111 and indicating means 113 may be provided with selecting means to distinguish between the first and second predetermined signals.

If local data device 101 assumes its receive mode of operation but the necessary conditions precedent to a data transmission are not satisfied, the first predetermined signal is not generated by status detecting means 111 and indicating means 113 does not provide the aforementioned indication of the readiness of the local data device to receive data. Similarly, if local data device 101 assumes its transmit mode of operation, status detecting means 111 does not generate the first predetermined signal and indicating means 113 is not energized thereby. The foregoing is an accurate description of corresponding conditions existent at the remote data device. Consequently, a second predetermined signal will not be sensed by status detecting means 111 and indicating means 113 will not provide an indication of the capability of the remote data device to receive data if the remote data device does not admit of its first quiescent state.

Returning now to the condition wherein the local data device 101 and the remote data device admit of their respective first quiescent states; if the remote data device is transferred to its transmit mode of operation, data may be transmitted thereby. The transmitted data is received over leased telephone lines 102, through transformer 107, through phase equalizing means 108, through filter-amplifying means 109 to limiting means 110. The thus received data is applied to local data device 101 which, in its first quiescent state, does not respond thereto. In addition, the received data is applied to status detecting means 111. It will be seen from the forthcoming description that data is represented by characteristic signals which are distinguished from the aforementioned second predetermined signal. For example, the second predetermined signal may admit of a specific frequency, amplitude, phase, duration, or the like that is absent from the characteristic signals. The converse of this may, of course, obtain. Accordingly, status detecting means 111 may include appropriate means, such as a filter, threshold detector, phase detector, pulse detector, or the like, for sensing a transmission of data.

It is recognized that once the remote data device transmits data to the local data device 101, the necessity of apprising the remote data device of the capability of the local data device to receive data ceases. Consequently, a sensed data transmission is effective to terminate the generation of the first predetermined signal by status detecting means 111. Moreover, a representation of the sensed data transmission is applied by status detecting means 111 to enable means 112. Enable means 112 is additionally supplied with a signal by local data device 101 representative of an assumed receive mode of operation. The enable means, which may include suitable combining circuits such as gating networks, or the like, responds to the representation applied thereto by status detecting means 111 and the signal supplied by local data device 101 to produce a receive enable signal. The receive enable signal is applied to local data device 101 by enable means 112 whereat the receive enable signal is utilized by appropriate circuitry therein to enable the local data device to operate in its assumed operating mode, i.e., the receive mode of operation. Thus, the local data device 101 now effectively utilizes the data applied thereto by limiting means 110. Local data device 101 is now disposed in its active state. Status detecting means 111 is provided with a representative signal to detect said active state and to energize indicating means 113. Indicating means 113 therefore provides a suitable indication of the active state assumed by local data device 101.

Upon completing a data transmission, an appropriate signal signifying such completion may be transmitted to local data device 101 by the remote data device to effect a de-energization of the local data device. When the local data device is de-energized, an appropriate signal is applied to enable means 112 to terminate the receive enable signal produced thereby. Local data device 101 is thus restored to its first quiescent state and is prepared to receive a subsequent data transmission in the aforedescribed manner. Additional means, not illustrated in FIG. 1, is provided in data coupling apparatus 103 to apprise an operator of the completion of a data transmission. The additional means is described further hereinbelow with respect to FIG. 3.

Let it now be assumed that local data device 101 and the remote data device again admit of their respective first quiescent states. It is recalled that a first predetermined signal is thus transmitted by status detecting means 111 to the remote data device and to indicating means 113. Hence, indicating means 113 provides an appropriate indication of the readiness of local data device to receive data. Similarly, a second predetermined signal is transmitted by the remote data device and sensed by status detecting means 111. Accordingly, indicating means 111 may be selectively adapted to provide an appropriate indication of the readiness of the remote data device to receive data. If local data device 101 is transferred to its transmit mode of operation and the necessary conditions precedent to a data transmission are satisfied, the second quiescent state of the local data device obtains. Status detecting means 111 thus terminates the generation of the first predetermined signal and indicating means 113 provides an appropriate indication of the readiness of local data device 101 to transmit data. A signal indicative of the sensed second predetermined signal is applied to enable means 112 by status detecting means 111 whereat it is combined with a signal applied by local data device 101 and representative of the second quiescent state. The enable means 112 responds to the signals applied thereto by status detecting means 111 and local data device 101 to produce a transmit enable signal. The transmit enable signal is applied to the local data device by enable means 112 such that the transmit enable signal is utilized by appropriate circuitry in the local data device to operate in its assumed operating mode, i.e., the transmit mode of operation. Thus, a transmission of data by local data device 101 is initiated and the active state thereof is now assumed. Status detecting means 111 is provided with a representative signal to detect said active state and to energize indicating means 113. Indicating means 113 therefore provides a suitable indication of the active state assumed by local data device 101.

Upon completing a data transmission, local data device 101 is de-energized and an appropriate signal is applied to enable means 112, whereby the transmit enable signal is terminated. Local data device 101 is thus restored to its second quiescent state and may be prepared to transmit subsequent data in the now understood manner. The aforementioned additional means is responsive to the de-energization of local data device 101 to apprise an operator of the completion of a data transmission.

Figure 2:
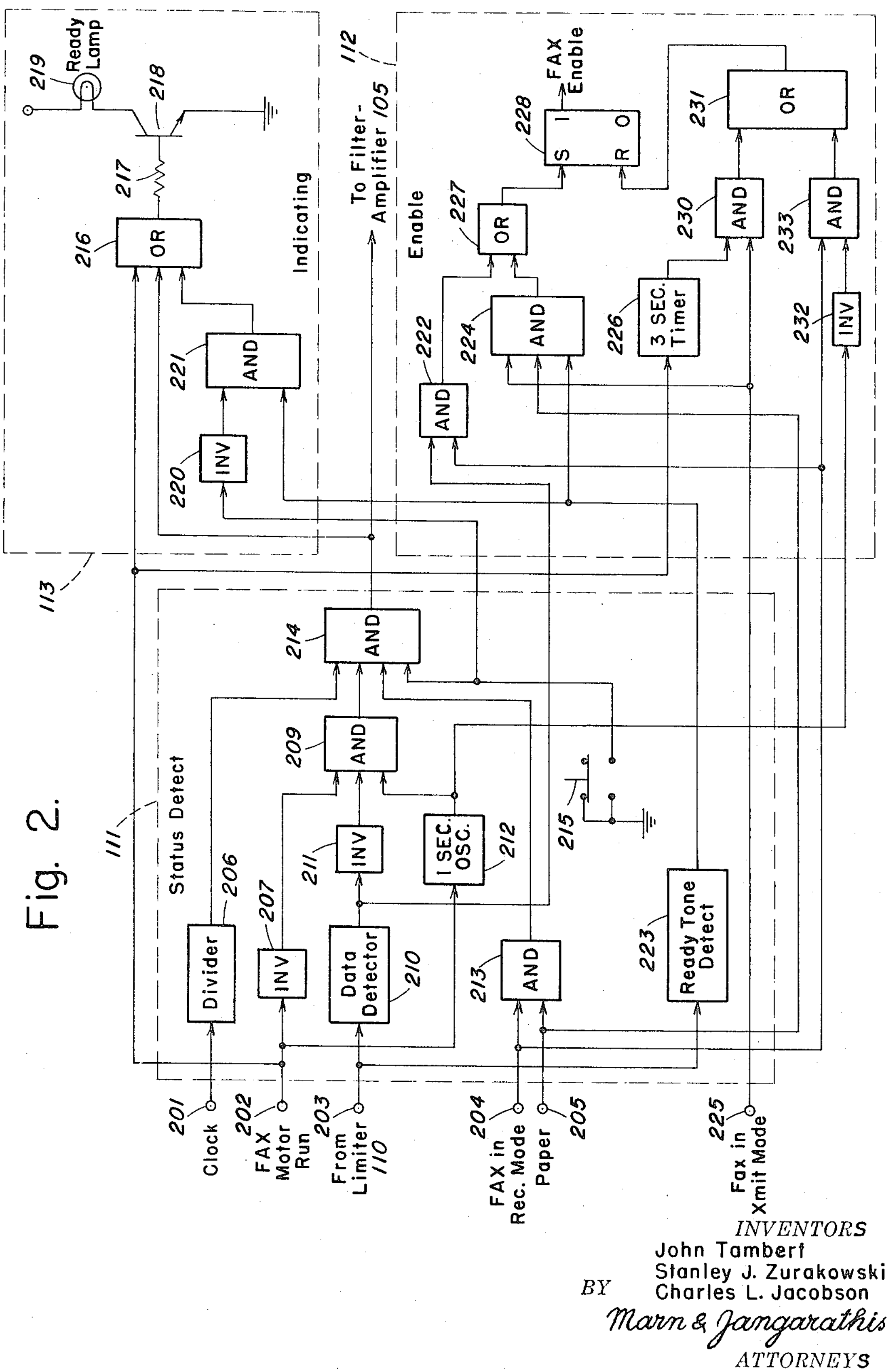
FIG. 2 is a logic diagram of a portion of the apparatus in accordance with the present invention.

In light of the foregoing description, it is readily apparent that status detecting means 111 and enable means 112 may comprise conventional gating networks. Accordingly, a logic circuit diagram of status detecting means 111, enable means 112 and, in addition, indicating means 113, is illustrated in FIG. 2. To facilitate a ready understanding of the present invention, the logic circuit illustrated in FIG. 2 will be described with respect to a specific example of a local data device. Thus, for the purpose of explanation, it will be assumed that the local data device is comprised of a facsimile transceiver similar to the Telecopier II or Telecopier III manufactured by Xerox Corporation. The facsimile transceiver is capable of selectively transmitting and receiving facsimile information in the form of a frequency modulated carrier wave. When in its transmit mode of operation, the facsimile transceiver transmits a "phasing" signal to a remote station prior to the transmission of facsimile information. The "phasing" signal may be a pulse signal comprised of bursts of tone admitting of a determined frequency. In addition, the "phasing" signal represents synchronizing information that is utilized at the remote station to obtain a synchronous relation with the facsimile transceiver. When in its receive mode of operation, the facsimile transceiver receives a "phasing" signal transmitted thereto by the remote station to obtain the necessary synchronous relation prior to the reception of facsimile information.

Status detecting means 111 is comprised of coincidence means 209, 213, and 214, data detecting means 210 and "ready" tone detecting means 223. A coincidence means may comprise a conventional combining circuit capable of combining each of the input signals applied thereto to produce an output signal. More particularly, an output signal is produced when corresponding input signals are applied in coinciding relationship. Accordingly, each of coincidence means 209, 213 and 214 may comprise a conventional AND gate which, in binary notation, is capable of producing a binary "1" at the output terminal thereof when a binary "1" is applied to each input terminal thereof. For purposes of explanation, it will be assumed that a binary "1" is represented by a positive d.c. voltage level and a binary "0" is represented by a reference d.c. voltage level such as ground. It is recognized that the representative voltage levels may be interchanged for binary 1's and 0's and moreover, negative voltage levels may be utilized. Alternatively, the coincidence means may comprise conventional NAND gates. Coincidence means 209 is adapted to produce a periodic pulse signal and includes a first input terminal coupled to terminal 202 via inverting means 207, a second input terminal coupled to data detecting means 210 via inverting means 211 and a third input terminal coupled to oscillating means 212. An inverting means is capable of performing a logic negation on a binary signal applied to the input terminal thereof. Accordingly, a binary 0 is produced in response to an applied binary 1 and conversely, a binary 1 is produced in response to an applied binary 0. Terminal 202 is coupled to the local facsimile transceiver and is adapted to receive an appropriate binary signal during a facsimile transmission. It will be understood that a binary 1 is applied to terminal 202 when the facsimile motor is energized.

Data detecting means 210 is coupled to terminal 203 and serves to detect a characteristic data signal applied thereto. For purposes of explanation, the characteristic data signal may correspond to the "phasing" signal, described hereinabove. Hence, data detecting means 210 may comprise a suitable filter to detect the bursts of determined frequency. Terminal 203 is coupled to limiting means 110 of FIG. 1. Oscillating means 212 is adapted to produce a periodic pulse signal comprised of alternating binary 1's and 0's, each admitting of a predetermined duration. An inhibit input terminal of oscillating means 212 is coupled to terminal 202. A binary 1 applied to the inhibit input terminal of oscillating means 212 tends to terminate the periodic pulse signal produced thereby and maintains a binary 1 at the output terminal thereof. Hence, oscillating means 212 may comprise a silicon controlled switch oscillating circuit, or other pulse controlled oscillating circuit.

The output terminal of coincidence means 209 is coupled to an input terminal of coincidence means 214. Another input terminal of coincidence means 214 is coupled to dividing means 206. The dividing means may comprise a conventional binary divider, well known to those of ordinary skill in the art, and serves to divide the frequency of an applied signal by a determinable factor. Accordingly, if a constant frequency clock signal is applied to terminal 201 which, in turn, is coupled to dividing means 206, a lower constant frequency signal will be produced by dividing means 206. The frequency of the signal produced by dividing means 206 is much greater than the frequency of the periodic pulse signal produced by oscillating means 212. It will soon be seen that oscillating means 212 and dividing means 206 admit of a cooperating relationship to produce the aforementioned first predetermined signal.

A further input terminal of coincidence means 214 is coupled to coincidence means 213 and an additional input terminal of coincidence means 214 is coupled to switch means 215. Coincidence means 213 is adapted to supply coincidence means 214 with a status signal representing the readiness of the local facsimile transceiver to receive facsimile information. Accordingly, first and second input terminals of coincidence means 213 are coupled to terminals 204 and 205, respectively. A binary 1 is adapted to be applied to terminal 205 by appropriate circuitry included in the local facsimile transceiver when said local facsimile transceiver is provided with an adequate supply of paper upon which facsimile information is recorded, or when the local facsimile transceiver is provided with an original document. Terminal 204 is coupled to suitable circuitry included in the local facsimile transceiver and receives a representative binary signal when the local facsimile transceiver admits of its receive mode of operation. It will be observed that coincidence means 213 is capable of detecting a first quiescent state obtained by the local facsimile transceiver.

The output terminal of coincidence means 214 is coupled in common relationship to filter-amplifying means 105 of FIG. 1 and to indicating means 113. Indicating means 113 is also coupled to an output terminal of "ready" tone detecting means 223. "Ready" tone detecting means 223 includes an input terminal coupled to terminal 203 and is adapted to detect a signal corresponding to the aforementioned second predetermined signal. Hence, "ready" tone detecting means 223 may comprise filter means, threshold detecting means, phase detecting means or pulse detecting means in accordance with the particular characteristic intrinsic to the signal to be detected. For the purpose of explanation, the "ready" tone may comprise pulse bursts of a predetermined frequency. Consequently "ready" tone detecting means 223 may comprise a suitable filter therefor.

Indicating means 113 is comprised of a visual indicator, such as READY lamp 219, selective energizing means 216 and coincidence means 221. Selective energizing means 216 is adapted to apply a binary signal supplied to any one input terminal thereof to the output terminal thereof. Hence, selective energizing means 216 may comprise a conventional OR circuit, and will be so referred to hereinafter, for producing a binary 1 in response to a binary 1 supplied to one or more input terminals thereof. A first input terminal of OR circuit 216 is coupled to the output terminal of coincdence means 214, a second input terminal of OR circuit 216 is coupled to terminal 202 and a third input terminal of OR circuit 216 is coupled to the output terminal of coincidence means 221. The output terminal of the OR circuit is coupled to the control, or base, electrode of transistor means 218 via current limiting resistance means 217. The output terminals of transistor means 218 are connected in series relationship with READY lamp 219 and ground. READY lamp 219 is additionally coupled to a source of energizing potential +V. Transistor means 218 serves to perform a switching function in response to a binary 1 applied to the control, or base, electrode thereof and therefore, may be replaced by other conventional switching means well known to those of ordinary skill in the art. Transistor means 218 may comprise a conventional NPN, PNP, FET transistor, or the like.

Coincidence means 221 is similar to aforedescribed coincidence means 209. The coincidence means 221 includes a first input terminal coupled to the output terminal of "ready" tone detecting means 223 and a second input terminal coupled to manually operable switch means 215 via inverting means 220. Switch means 215 serves to provide an appropriate binary signal in response to the manual operation thereof. The switch means may comprise a conventional two-position switch such as a toggle switch, a single pole-single throw switch, a relay locking switch, a push-button switch or the like. In the illustrated embodiment, switch means 215 is comprised of a spring loaded push-button switch including two pairs of contacts. In its normal quiescent position, switch means 215 provides a connection between a first pair of contacts and in its operated, or depressed position, switch means 215 provides a connection between the second pair of contacts. One contact of each pair of contacts is connected to ground and the other contact of the second pair of contacts is connected to coincidence means 214 and to inverting means 220. The remaining contact of the first pair of contacts is not connected to further means.

Enable means 112 is comprised of coincidence means 222, 224, 230 and 233, timing means 226 and storage means 228. Storage means 228 is adapted to store an enable signal that is utilized by the local facsimile transceiver to commence operation. The storage means may comprise a conventional storage device such as a bistable device, a register, a storage capacitor, or the like. In the illustrated embodiment, the storage means is comprised of flip-flop means 228 having set and reset input terminals and one and zero output terminals. It is recognized that a binary 1 applied to the set input terminal of flip-flop means 228 is effective to set the flip-flop means to its "one" state whereby a binary 1 is provided at the one output terminal thereof. Similarly, a binary 1 applied to the reset input terminal of flip-flop means 228 is effective to reset the flip-flop means to its "zero" state whereby a binary 0 is provided at the one output terminal thereof. The one output terminal of flip-flop means 228 is coupled to appropriate motor control circuitry included in the local facsimile transceiver.

The set input terminal of flip-flop means 228 is selectively coupled to the output terminals of coincidence means 222 and 224 by OR circuit 227. OR circuit 227 is similar to OR circuit 216, and includes first and second input terminals coupled to respective output terminals of coincidence means 222 and 224. Coincidence means 222 is similar to aforedescribed coincidence means 209 and includes a first input terminal coupled to data detecting means 210 and a second input terminal coupled to terminal 204. Coincidence means 222 is adapted to produce a receive enable signal. It will be seen that, if desired, the second input terminal of coincidence means 222 may be coupled to the output terminal of coincidence means 213. Coincidence means 224, which may be similar to coincidence means 222, is adapted to produce a transmit enable signal and includes a first input terminal coupled to "ready" tone detecting means 223, a second input terminal coupled to terminal 205 and a third input terminal coupled to terminal 225. Terminal 225 is coupled to suitable circuitry included in the local facsimile transceiver and receives a representative binary signal when the local facsimile transceiver admits of its transmit mode of operation. The binary signals applied to terminals 204 and 225 are complementary such that a binary 1 applied to one terminal is accompanied by a binary 0 applied to the other terminal.

The reset input terminal of flip-flop means 228 is coupled to reset means comprised of coincidence means 230 and 233 and timing means 226. Coincidence means 233 is adapted to produce a first reset signal and includes a first input terminal coupled to terminal 204 and a second input terminal coupled to oscillating means 212 via inverting means 232. It will soon be appreciated that the second input terminal of coincidence means 233 may be coupled to a conventional timing circuit capable of producing an output signal at a predetermined time subsequent to the application of an input signal thereto. The output terminal of coincidence means 233 is coupled to the reset input terminal of flip-flop means 228 via OR circuit 231.

Concidence means 230 is adapted to produce a second reset signal and includes a first input terminal coupled to terminal 225 and a second input terminal coupled to timing means 226. Timing means 226 includes an inhibit input terminal coupled to terminal 202 whereby the operation of the timing means is inhibited when a binary 1 is applied to terminal 202. Timing means 226 is adapted to produce a binary 1 at the output terminal thereof at a predetermined period of time subsequent to the application of a binary 0 to the inhibit input terminal thereof. Timing means 226 may comprise a conventional timing device such as a binary counter, an R-C timing circuit or the like. Alternatively, the timing means may comprise a Schmitt trigger circuit. It will soon be seen that the second input terminal of coincidence means 233 may be coupled to a timing device similar to timing means 226, but having a different delay characteristic. Moreover a single variable timing circuit may be coupled to the second input terminals of each of coincidence means 230 and 233, which variable timing circuit may produce a binary 1 when a binary 1 is applied to first or second input terminals thereof at first or second predetermined times, respectively, subsequent to the application of a binary 0 to an inhibit input terminal thereof. The output terminal of coincidence means 230 is coupled to the reset input terminal of flip-flop means 228.

The operation of the apparatus illustrated in FIG. 2 will now be described. It will be assumed that the local facsimile transceiver admits of its receive mode of operation and, therefore, a binary 1 is received at terminal 204. If the local facsimile transceiver is suitably supplied with paper upon which facsimile information is recorded, and if the requisite conditions precedent to a data transmission are satisfied, a binary 1 is received at terminal 205. Consequently, coincidence means 213 supplies a binary 1 to an input terminal of coincidence means 214. Dividing means 206 operates in the well-known manner upon clock signals received at terminal 201 to supply another input terminal of coincidence means 214 with a constant frequency signal. It will soon be described that the periodic pulse signal produced by oscillating means 212 and applied to coincidence means 209 is supplied by the coincidence means 209 to an additional input terminal of coincidence means 214. Now, if switch means 215 is not operated, and assumes the illustrated position thereof, a binary 1 is supplied to a further input terminal of coincidence means 214 by the contact of the switch means coupled thereto. Accordingly, coincidence means 214 is effective to produce pulse bursts of the constant frequency signal, each pulse burst admitting of a duration determined by the duration of the alternating binary 1's produced by oscillating means 212. This signal produced by coincidence means 214 is representative of the first quiescent state assumed by the local facsimile transceiver and indicative of the readiness of said facsimile transceiver to receive facsimile information. It is recognized that, if desired, dividing means 206 and oscillating means 212 may be combined in a single "ready" tone generating circuit that may supply coincidence means 214 with an appropriate signal.

The thus produced pulse bursts of constant frequency are applied to filter-amplifying means 105, through impedance matching means 106, across transformer 107, over the leased telephone lines 102 to a remote device. For purposes of explanation, it will be assumed that the remote device is comprised of a facsimile transceiver, similar to the local facsimile transceiver and hereinafter designated the remote facsimile transceiver, coupled to leased telephone lines 102 by data coupling apparatus identical to that described herein. It is observed that coincidence means 214 additionally applies the pulse bursts of constant frequency to an input terminal of OR circuit 216 which, in turn, supplies the pulse bursts of constant frequency to the control, or base, electrode of transistor means 218. If the constant frequency included in each pulse burst admits of a high enough value, transistor means 218 will be activated into its conducting state during each pulse burst. Accordingly, current flows from the source of energizing potential +V, through READY lamp 219, across the collector-emitter junction of transistor means 218 to ground. Hence, READY lamp 219 is illuminated. It is appreciated that the illumination of READY lamp 219 is characterized by a pulsating illumination corresponding in frequency to that of the periodic pulse signal produced by oscillating means 212. It is further recognized that if the constant frequency of the pulse bursts applied to the control, or base, electrode of transistor means 218 results in the alternating activation of transistor means 218 into its conducting and non-conducting states, respectively, READY lamp 219 will be provided with a flickering illumination. However, the flickering is not readily perceptible to the human eye.

Since the local facsimile transceiver admits of its quiescent state, a binary 0 is applied to terminal 202. In addition, switch means 215 is not operated and coincidence means 221 produces a binary 0. Thus, it is seen that the remaining input terminals of OR circuit 216 are each supplied with a binary 0, and READY lamp 219 provides an indication of the readiness of the local facsimile transceiver to receive facsimile information.

The binary 0 applied to terminal 202 is inverted by inverting means 207 which supplies a binary 1 to the first input terminal of coincidence means 209. If the remote facsimile transceiver is not transmitting facsimile information, that is, if the remote facsimile transceiver admits of its first or second quiescent state or is, in fact, de-energized, synchronizing signals are not received by limiting means 110 and, therefore, terminal 203 does not receive synchronizing signals. Data detecting means 210 is adapted to produce a binary 1 only upon detecting synchronizing signals applied thereto. Hence, data detecting means 210 applies a binary 0 to inverting means 211 which, in turn supplies a second input terminal of coincidence means 209 with a binary 1. It is now recognized that the periodic pulse signal produced by oscillating means 212 and applied to the third input terminal of coincidence means 209 results in a corresponding periodic pulse signal at the output terminal of coincidence means 209.

If the remote facsimile transceiver admits of its first quiescent state, a signal analogous to that produced by coincidence means 214 is generated by corresponding apparatus and transmitted over the leased telephone lines 102, through transformer 107, through phase equalizing means 108, through filter-amplifying means 109, through limiting means 110 where it is applied to terminal 203. This signal, it is understood, represents the readiness of the remote facsimile transceiver to receive facsimile information, and will be referred to herein as a "ready" tone. It is observed that the signal produced by coincidence means 214, which may also be referred to as a "ready" tone, is also transmitted from impedance matching means 106 through phase equalizing means 108, through filter-amplifying means 109, through limiting means 110 to terminal 203. Hence, terminal 203 is supplied with locally generated and remotely generated "ready" tone. "Ready" tone detecting means 223 responds to the supplied "ready" tone, irrespective of the source thereof, to produce a binary 1. The produced binary 1 is applied to an input terminal of coincidence means 221. The origin of the supplied "ready" tone may be ascertained by operating switch means 215. When switch means 215 is depressed, ground potential, which is equivalent to a binary 0 is applied to an input terminal of coincidence means 214 and to inverting means 220. The binary 0 applied to coincidence means 214 is effective to inhibit the further operation thereof. Consequently coincidence means 214 does not supply terminal 203 with locally generated "ready" tone. Moreover, the binary 0 applied to inverting means 220 results in a binary 1 supplied to an input terminal of coincidence means 221. Thus, if "ready" tone is detected by "ready" tone detecting means 223, it may be concluded to be remotely generated "ready" tone. Coincidence means 221 thus supplies an input terminal of OR circuit 216 with a signal corresponding to the output of "ready" tone detecting means 223. Accordingly, OR circuit 216 activates transistor means 218 into its conducting state and READY lamp 219 is appropriately illuminated. An operator may therefore determine the capability of the remote facsimile transceiver to receive facsimile information by observing the illumination of READY lamp 219 while operating switch means 215. Consequently, if switch means 215 is operated but READY lamp 219 is extinguished, an operator is apprised of the inability of the remote facsimile transceiver to commence a data receiving operation, and facsimile information will not be transmitted thereto.

It will now be assumed that, while the local facsimile transceiver admits of its first quiescent state, the remote facsimile transceiver assumes its active state and facsimile information is transmitted thereby. It is recalled that prior to the transmission of facsimile information, synchronizing signals are transmitted to obtain a proper synchronous relationship between the local and remote facsimile transceivers. The synchronizing signals are transmitted over leased telephone lines 102 and received by transformer 107, phase equalizing means 108, filter-amplifying means 109, limiting means 110 and terminal 203. The synchronizing signals are also applied to the local facsimile transceiver which cannot, at this time, effectively utilize said signals.

The synchronizing signals are detected by data detecting means 210 which produces a binary 1 in response thereto. Inverting means 211 responds to the produced binary 1 to supply conincidence means 209 with a binary 0. Coincidence means 209 is thus deactivated and applies a binary 0 to coincidence means 214. Accordingly, the "ready" tone generated by coincidence means 214 is terminated and a binary "0" is produced thereby. The binary 0, supplied to the control, or base, electrode of transistor means 218 by OR circuit 216, returns the transistor means to its non-conducting state and READY lamp 219 is extinguished. If switch means 215 is now operated, "ready" tone detecting means 223 will sense the absense of "ready" tone at terminal 203 and READY lamp 219 will remain extinguished. An operator may thus be apprised that facsimile information is to be received. However, it will be seen from the following description that the present invention affords the reception of facsimile information without the assistance of an operator.

The binary 1 produced by data detecting means 210 is additionally supplied to an input terminal of coincidence means 222. The remaining input terminal of illustrated coincidence means 222 is supplied with the binary 1 provided at terminal 204, which is indicative of the receive mode of operation assumed by the local facsimile transceiver. Accordingly, coincidence means 222 is effective to produce a receive enable signal, corresponding to a binary 1, that is transmitted by OR circuit 227 to the set input terminal of flip-flop means 228. Flip-flop means 228 is thus set to its "one" state and the receive enable signal supplied thereto is stored therein. Consequently, the one output terminal of flip-flop means 228 applies a binary 1 to appropriate circuitry included in the local facsimile transceiver to enable the facsimile motor to commence operation in response to the received synchronizing signals. It should now be appreciated that the synchronizing signals received by limiting means 110 may now be utilized to energize the facsimile motor included in the facsimile transceiver whereby the facsimile motor operates in synchronous relationship with the corresponding facsimile motor included in the remote facsimile transceiver.

The operation of the facsimile motor results in a binary 1 applied to terminal 202 by suitable facsimile transceiver circuitry. Oscillating means 212 receives the binary 1 and responds thereto to suspend its operation and provide a binary 1 at the output terminal thereof. Hence, inverting means 232 is no longer supplied with alternating binary 1's and 0's but, rather, receives a constant binary 1 to apply, in turn, a binary 0 to the input terminal of coincidence means 233 coupled thereto. It is recalled that coincidence means 233 is adapted to generate a first reset signal subsequent to the completion of the reception of facsimile information. The reset signal, however, is not generated when a binary 0 is applied thereto. It is observed, therefore, that if oscillating means 212 responds to the binary 1 coupled thereto by terminal 202 to produce a constant binary 0 at its output terminal, inverting means 232 may be omitted. In an alternative embodiment of the illustrated apparatus, it is contemplated that coincidence means 233 is not provided with a signal produced by oscillating means 212 but, in contradistinction thereto, is supplied with an output signal produced by suitable timing means, similar to aforementioned timing means 226. It is contemplated that, in the alternative embodiment, coincidence means 233 receives a binary 0 from the suitable timing means when a binary 1 is provided at terminal 202. Hence, coincidence means 233 is inhibited from generating the first reset signal when the facsimile motor included in the local facsimile transceiver is operating.

It should be pointed out that, in the illustrated embodiment, once the facsimile motor included in the local facsimile transceiver commences operation in response to the binary 1 produced by flip-flop means 228, the facsimile motor is not de-energized until the completion of the facsimile transmission. Accordingly, if received synchronizing signals are detected by data detecting means 210 when oscillating means 212 admits of an oscillating cycle such that a binary 0 is provided at the output terminal thereof, it will be observed that coincidence means 222 and 233 include first common connected input terminals supplied with a binary 1 by terminal 204, and second input terminals supplied with a binary 1 by data detecting means 210 and inverting means 232, respectively. Thus, OR circuits 227 and 231 apply a binary 1 to the respective set and reset input terminals of flip-flop means 228. As is understood by those of ordinary skill in the art, flip-flop means 228 does not respond to a binary 1 simultaneously applied to each input terminal thereof and, therefore, the flip-flop means retains its "zero" state. A binary 0 is thus applied by flip-flop means 228 to the appropriate circuitry included in the local facsimile transceiver, and the facsimile motor is not enabled to respond to the received synchronizing signals. Hence, terminal 202 is provided with a binary 0. The continuation of the oscillating cycle of oscillating means 212 is not disturbed and a binary 1 is subsequently provided at the output terminal thereof. Hence, inverting means 232 applies a binary 0 to coincidence means 233 and OR circuit 231 supplies the reset input terminal of flip-flop means 228 with a binary 0. Consequently, flip-flop means 228 responds to the binary 1 applied to the set input terminal thereof to assume its "one" state. The facsimile motor included in the local facsimile transceiver now commences operation in response to the received synchronizing signals and a binary 1 is applied to terminal 202 to suspend the operation of oscillating means 212.

It is observed that when a binary 1 is applied to terminal 202, representative of the active state assumed by the local facsimile transceiver during a facsimile transmission, inverting means 207 applies a binary 0 to coincidence means 209 which, in turn, is applied to coincidence means 214 to inhibit the generation of the "ready" tone. In addition, the binary 1 is supplied from terminal 202 to OR circuit 216 to the control, or base, electrode of transistor means 218. The transistor means is activated to its conducting state and READY lamp 219 admits of a constant illumination indicative of the active state assumed by the local facsimile transceiver. Furthermore, the binary 1 at terminal 202 is coupled to timing means 226 to maintain the timing means in a deactivated condition whereby a binary 0 is provided at the output terminal thereof.

When the remote facsimile transceiver transmits facsimile information, the transmission of synchronizing signals is terminated and data detecting means 210 produces a binary 0. The receive enable signal produced by coincidence means 222 is thus terminated; however, a manifestation of the receive enable signal continues to be stored by flip-flop means 228. Accordingly, the facsimile motor included in the local facsimile transceiver continues to operate and the transmitted facsimile information is received over leased telephone lines 102, through transformer 107, through phase equalizing means 108, through filter-amplifying means 109, through limiting means 110 to the local facsimile transceiver. At the conclusion of a facsimile transmission, the facsimile motor included in the local facsimile transceiver is de-energizing and further operation thereof is suspended. The facsimile motor may be de-energized in response to an "end-of-transmission" signal transmitted to the local facsimile transceiver by the remote facsimile transceiver. Consequently, terminal 202 is provided with a transition from a binary 1 to a binary 0. Oscillating means 212 resumes its operation and a binary 0 is provided at the output terminal thereof at the conclusion of a pulse duration time. Hence, a binary 0 is supplied to inverting means 232 at a first predetermined time subsequent to the completion of a facsimile reception by the local facsimile transceiver.

The binary 0 provided at terminal 202 is also transmitted by OR circuit 216 to the control, or base, electrode of transistor means 218 to restore the transistor means to its non-conducting state. READY lamp 219 is thus extinguished. In addition, the binary 0 at terminal 202 is inverted by inverting means 207 which, in turn, applies a binary 1 to the first input terminal of coincidence means 209. The first and second input terminals of coincidence means 209 are now provided with binary 1's such that the periodic pulse signal produced by the resumed operation of oscillating means 212 is applied therethrough to coincidence means 214. If, at the conclusion of a facsimile reception, the local facsimile receiver returns to its first quiescent state, coincidence means 214 produces the aforedescribed "ready" tone which is applied to filter-amplifying means 105 to be transmitted to the remote facsimile transceiver, and through OR circuit 216 to the control, or base, electrode of transistor means 218. READY lamp 219 effects a pulsating illumination indicative of the restored first quiescent state obtained by the local facsimile transceiver.

The binary 0 supplied to inverting means 232 at the aforementioned first predetermined time subsequent to the completion of a facsimile reception is inverted thereby to supply coincidence means 233 with a binary 1. It is here noted that, if the input terminal of coincidence means 233 coupled to inverting means 232 is alternatively coupled to suitable timing means, similar to timing means 226, a binary 1 of determined duration will be applied to said input terminal of coincidence means 233 at a first predetermined time subsequent to the transition of a binary 1 to a binary 0 at terminal 202. In either the illustrated embodiment or the contemplated alternate embodiment, coincidence means 233 generates a first reset signal, corresponding to a binary 1, at a first predetermined time subsequent to a completed data reception. This obtains because terminal 204 supplies a first input terminal of coincidence means 233 with a binary 1 representative of the receive mode of operation assumed by the local facsimile transceiver, and a binary 1 is subsequently supplied to the second input terminal of coincidence means 233 by inverting means 232 or by the suitable timing means that may be coupled thereto. The generated first reset signal is applied to the reset input terminal of flip-flop means 228 to restore the flip-flop means to its "zero" state. The binary 1 previously applied to appropriate circuitry included in the local facsimile transceiver to enable the facsimile motor to commence operation is thus terminated. The apparatus illustrated in FIG. 2 is now prepared to control the operation of the local facsimile transceiver in response to a subsequently received facsimile transmission in the aforedescribed manner.

It should be noted that the transition of a binary 1 to a binary 0 at terminal 202 will activate timing means 226 to produce a binary 1 of a determined duration at a second predetermined time thereafter. However, since the local facsimile transceiver admits of a receive mode of operation, the binary 1 provided at terminal 204 is accompanied by a binary 0 provided at terminal 225. Consequently, terminal 225 supplies a first input terminal of coincidence means 230 with a binary 0, thereby inhibiting the coincidence means from responding to the binary 1 applied thereto by timing means 226. Hence, the operation of timing means 226 has no affect on the illustrated apparatus when the local facsimile transceiver admits of its receive mode of operation.

It should now be readily appreciated that the data coupling apparatus as disclosed herein, affords automatic control of a facsimile transceiver coupled thereto to enable a facsimile transmission to be received and effectively utilized. Moreover, a multiple of facsimile messages may be successively received until the supply of paper, upon which facsimile information is recorded, is exhausted. When the local facsimile transceiver is no longer supplied with paper, a binary 0 is applied to terminal 205 and coincidence means 213 responds thereto to supply coincidence means 214 with a binary 0. Hence, coincidence means 214 is inhibited from generating a "ready" tone and, as will soon be described, a facsimile transmission is not commenced by the remote facsimile transceiver in the absence of received "ready" tone. One of ordinary skill in the art will now appreciate that facsimile information may be received by apparatus in accordance with the present invention without the assistance of an operator. Nevertheless, when a facsimile transmission is terminated, an end-of-message lamp, soon to be described, is illuminated.

Upon completion of a facsimile reception, the local facsimile transceiver admits of its first quiescent state. If the remote facsimile transceiver assumes its first quiescent state, it is recalled that "ready" tone is transmitted thereby and received by limiting means 110. Let it now be assumed that the local facsimile transceiver obtains its transmit mode of operation such that a binary 1 is applied to terminal 225 and a binary 0 is applied to terminal 204. It is observed that coincidence means 213 responds to the binary 0 applied thereto by terminal 204 to supply an input terminal of coincidence means 214 with a binary 0. Hence, the "ready" tone is not generated by coincidence means 214 and OR circuit 216 does not receive a binary 1 at any input terminal thereof. Consequently, the OR circuit applies a binary 0 to the control, or base, electrode of transistor means 218 whereby the transistor means maintains its non-conducting state. READY lamp 219 is extinguished to indicate the assumption of the transmit mode of operation by the local facsimile transceiver.

"Ready" tone received from the remote facsimile transceiver is detected by "ready" tone detecting means 223 and a suitable binary 1 applied thereby to an input terminal of coincidence means 221. An operator may be apprised of the capability of the remote facsimile transceiver to receive facsimile information by operating switch means 215. When switch means 215 is depressed, ground potential corresponding to a binary 0 is extended to inverting means 220 which, in turn, applies a binary 1 to the other input terminal of coincidence means 221. Accordingly, the indication provided by "ready" tone detecting means 223 when received "ready" tone is applied thereto by terminal 203 is transmitted through coincidence means 221, through OR circuit 216 to the control, or base, electrode of transistor means 218. The transistor means is activated to its conducting state and READY lamp 219 is appropriately illuminated to indicate the readiness of the remote facsimile transceiver to receive facsimile information.

If the necessary conditions precedent to the transmission of facsimile information are satisfied, and if an original document to be scanned is provided therein, the local facsimile transceiver will apply a binary 1 to terminal 205. Accordingly, coincidence means 224 is provided with a binary 1 at the input terminal thereof coupled to terminal 225, a binary 1 at the input terminal thereof coupled to terminal 205 and a binary 1 at the input terminal thereof coupled to "ready" tone detecting means 223. Consequently, coincidence means 224 produces a transmit enable signal corresponding to a binary 1 at the output terminal thereof, which binary 1 is applied to the set input terminal of flip-flop means 228 by OR circuit 227. Flip-flop means 228 is thus set to its "one" state and the transmit enable signal supplied thereto is stored therein. Consequently, the one output terminal of flip-flop means 228 applies a binary 1 to appropriate circuitry included in the local facsimile transceiver to enable the facsimile motor to commence operation. It should be appreciated that, when the second quiescent state of the local facsimile transceiver is obtained, the binary 1 supplied by flip-flop means 228 initiates a facsimile transmission comprised of synchronizing signals followed by facsimile information. The synchronizing signals and facsimile information are transmitted from the local facsimile transceiver to attenuating means 104, through filter-amplifying means 105, through impedance matching means 106, through transformer 107, across leased telephone lines 102 to the remote facsimile transceiver. It is observed that the transmitted synchronizing signals may additionally traverse a conducting path from impedance matching means 106 through phase equalizing means 108, through filter-amplifying means 109, through limiting means 110 to terminal 203. The synchronizing signals are detected by data detecting means 210 which applies a binary 1 to an input terminal of coincidence means 222. The coincidence means is inhibited from responding to the applied binary 1, however, because of the binary 0 applied to the other input terminal thereof by terminal 204.

First and second reset signals are not generated at this time because coincidence means 233 includes an input terminal provided with a binary 0 by terminal 204 and coincidence means 230 is provided with a binary 0 by timing means 226. It should be recognized that the timing means remains in a deactivated condition until a transition of a binary 1 to a binary 0 is provided at the input terminal thereof.

The operation of the facsimile motor included in the local facsimile transceiver results in a binary 1 applied to terminal 202 by suitable facsimile transceiver circuitry. The binary 1 is transmitted to the control or base electrode of transistor means 218 by OR circuit 216. The transistor means is activated to its conducting state and READY lamp 219 admits of a constant illumination indicative of the active state assumed by the local facsimile transceiver. It is here noted that, though the response of oscillating means 212 to the binary 1 applied to terminal 202 has been described in detail hereinabove, further explanation of the oscillating means is not pertinent to the operation of the illustrated apparatus now being described; hence, none is offered. In addition, the receipt of synchronizing signals by the remote facsimile transceiver in response to the initiated operation of the facsimile motor of the local facsimile transceiver, terminates the "ready" tone supplied to terminal 203. Hence, a binary 0 is applied to coincidence means 224 and the transmit enable signal produced thereby is thus terminated. However, a manifestation of the transmit enable signal continues to be stored by flip-flop means 228 and the facsimile motor continues to operate. At the conclusion of a facsimile transmission, the facsimile motor included in the local facsimile transceiver is de-energized and further operation thereof is suspended. The facsimile motor may be de-energized when a complete document has been scanned by the facsimile transceiver. Consequently, terminal 202 is provided with a transition of a binary 1 to a binary 0.

The binary 0 provided at terminal 202 is transmitted by OR circuit 216 to the control, or base, electrode of transistor means 218 to restore the transistor means to its non-conducting state. READY lamp 219 is thus extinguished. In addition, the transition of a binary 1 to a binary 0 at terminal 202 is effective to actuate timing means 226. Hence, a binary 1 of determined duration will be applied by timing means 226 to an input terminal of coincidence means 230 at the aforementioned second predetermined time subsequent to the completion of a facsimile transmission. Another input terminal of coincidence means 230 is provided with a binary 1 by terminal 225, representing that the local facsimile transceiver admits of a transmit mode of operation. Thus, coincidence means 230 generates the aforementioned second reset signal, corresponding to a binary 1, at the second predetermined time subsequent to a completed transmission. The generated second reset signal is applied to the reset input terminal of flip-flop means 228 to restore the flip-flop means to its "zero" state. The binary 1 previously applied to appropriate circuitry included in the local facsimile transceiver to commence the operation of the facsimile motor is thus terminated. In addition, the aforementioned end-of-message lamp is illuminated. The illustrated apparatus is now prepared for a subsequent facsimile transmission in the now understood manner.

As has been previously described, coincidence means 233 is responsive to oscillating means 212 or an equivalent timing means, when the local facsimile transceiver admits of its receive mode of operation to generate the first reset signal at a first predetermined time subsequent to the completion of a facsimile reception. Likewise, coincidence means 230 is responsive to timing means 226 when the local facsimile transceiver admits of its transmit mode of operation to generate the second reset signal at a second predetermined time subsequent to the completion of a facsimile transmission. The second predetermined time is chosen to exceed the first predetermined time to afford an operator sufficient time immediately following a transmission to execute further related functions such as initiate a subsequent transmission, if so desired; however, the illustrated data coupling apparatus is radidly returned to its first quiescent state to permit the automatic reception of a facsimile transmission that may be transmitted thereto immediately following a completed transmission. Accordingly, if desired, the first and second reset signals may be generated by a conventional variable timing means including an inhibit input terminal coupled to terminal 202, a first input terminal coupled to terminal 204 and a second input terminal coupled to terminal 225. Thus, if the local facsimile transceiver admits of its receive mode of operation, a binary 1 is applied to the first input terminal. The variable timing means will respond to a transition of a binary 1 to a binary 0 at terminal 202 to generate the first reset signal at the first predetermined time thereafter. Conversely, if the local facsimile transceiver admits of its transmit mode of operation, a binary 1 is applied to the second input terminal of the variable timing means. The variable timing means will now respond to a transition of a binary 1 to a binary 0 at terminal 202 to generate the second reset signal at the second predetermined time thereafter. Accordingly, the output terminal of the variable timing means may be coupled directly to the reset input terminal of flip-flop means 228 and coincidence means 230 and 233, inverting means 232, OR circuit 231 and timing means 226 may be omitted. It is further contemplated that, if the first and second reset signals need not be generated at first and second predetermined times subsequent to the completion of a facsimile communication, but may manifest a common time delay, then a single timing circuit, such as timing means 226, characterized by a suitable time delay function, may be directly interposed between terminal 202 and the reset input terminal of flip-flop means 228. In this configuration, flip-flop means 228 will be reset to its "zero" state at a pre-established interval of time following the completion of a facsimile reception or facsimile transmission.

Figure 3:
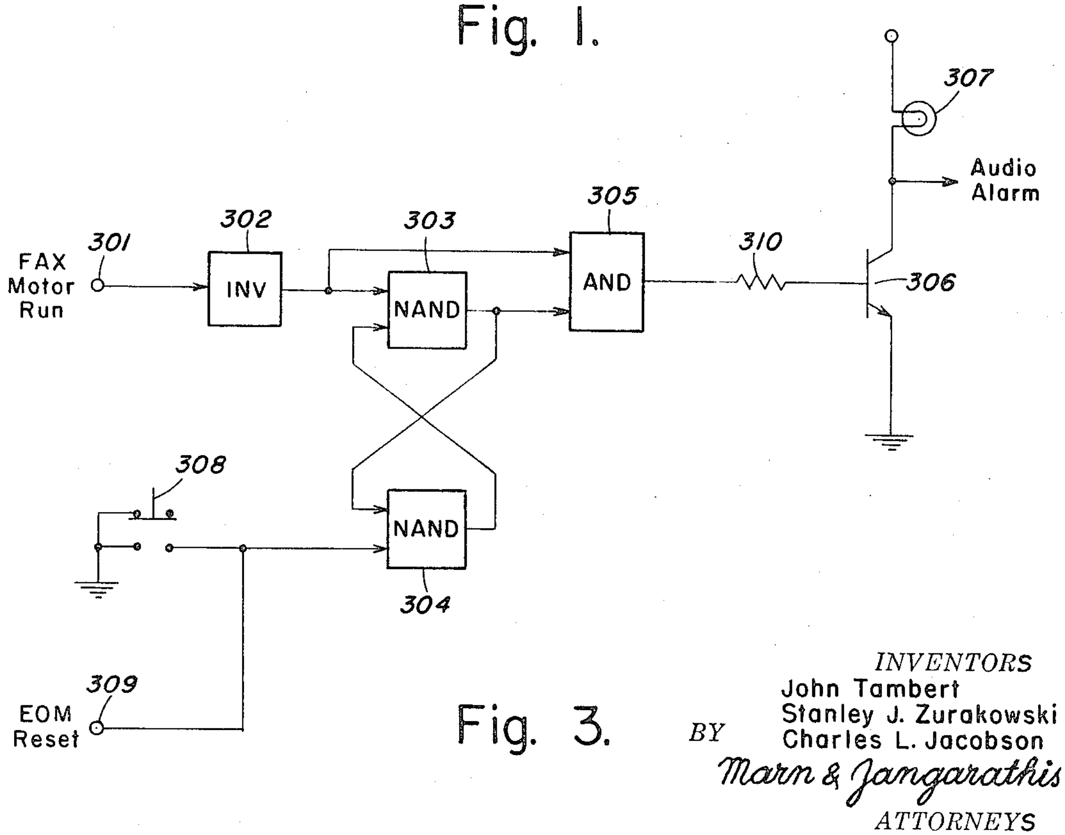
FIG. 3 is a logic diagram of another portion of the apparatus of the present invention.

The aforedescribed indication of the completion of a facsimile transmission is provided by the apparatus illustrated in FIG. 3 which comprises NAND gates 303 and 304, coincidence means 305 and lamp 307. NAND gates 303 and 304 are interconnected in a conventional manner to form a flip-flop circuit. It will be appreciated that other readily available flip-flop circuits, such as aforedescribed flip-flop means 228, may be utilized herein. As is understood by those of ordinary skill in the prior art, a NAND gate is similar to a coincidence circuit and is adapted to produce a binary 0 at the output terminal thereof in response to a binary 1 supplied to each input terminal thereof. Conversely, a binary 1 is produced in response to a binary 0 applied to any one input terminal thereof. NAND gate 303 includes an input terminal coupled to terminal 301 via inverting means 302. The inverting means 302 is similar to aforedescribed inverting means 207. The output terminal of inverting means 302 and the output terminal of NAND gate 303 are coupled to respective input terminals of coincidence means 305. An input terminal of NAND gate 304 is connected in common relationship to switch means 308 and to terminal 309. Switch means 308 is similar to aforedescribed means 215 and may comprise a single-pole-single throw switch, a spring loaded pushbutton switch or the like. One contact of each pair of contacts of the switch means 308 is connected to ground and the other of one of the pairs of contacts is connected to the input terminal of NAND gate 304.

The output terminal of coincidence means 305 is coupled by a current limiting resistance means 310 to the control, or base, electrode of transistor means 306. The output terminals of transistor means 306 are connected in series relationship with lamp means 307 and ground. Transistor means 306 is additionally coupled to an audio alarm circuit, not shown. Lamp means 307 is further connected to a source of energizing potential +V. The transistor means 306 is adapted to perform a switching function and therefore may comprise an NPN, PNP or FET transistor, or the like. Alternatively, transistor means 306 may be replaced by other conventional switching devices.

In operation, a facsimile communication is initiated by enabling the facsimile motor to be energized in response to the setting of flip-flop means 228 to its "one" state, previously described with respect to FIG. 2. Control circuitry included in the facsimile transceiver responds to the energization of the motor to apply a binary 1 to terminal 301. The binary 1 is inverted by inverting means 302 and applied as a binary 0 to the input terminal of NAND gate 303. Accordingly, a binary 1 is produced by NAND gate 303 and applied to coincidence means 305. The binary 1 is additionally intercoupled to an input terminal of NAND gate 304. If switch means 308 assumes its illustrated position and if terminal 309 is not provided with a binary 0, NAND gate 304 will be supplied with a binary 1 at each input terminal thereof to produce a binary 0 at its output terminal. It is observed that coincidence means 305 will be supplied with a binary 1 by NAND gate 303 and a binary 0 by inverting means 302. Hence, transistor means 306 is provided with a binary 0 at its control, or base, electrode and assumes its non-conducting state.

At the completion of the facsimile communication, the facsimile motor is de-energized and appropriate circuitry applies a binary 0 to terminal 301. Inverting means 302 therefore supplies NAND gate 303 and coincidence means 305 with a binary 1. It is recognized that the binary 1 applied to NAND gate 303 does not affect the output signal produced thereby because NAND gate 304 continues to supply a binary 0 to the input terminal of NAND gate 303 connected thereto. Consequently, coincidence means 305 now detects a binary 1 at each input terminal thereof and a binary 1 is supplied to the control, or base, electrode of transistor means 306. The transistor means is thus activated to its conducting state and current flows from the source of energizing potential +V, through lamp means 307, across the collector-emitter junction of transistor means 306 to ground. Lamp means 307 is now illuminated to apprise an operator of the completion of a facsimile transmission. In addition, an indication of the conducting state of transistor means 306 is applied to the audio alarm circuit not shown, to produce an audible tone. The completion of a facsimile transmission is therefore indicated by a visual and an audible indication. Should a subsequent facsimile transmission ensue, terminal 301 is supplied with a binary 1 in response to the energization of the motor, and inverting means 302 applies a binary 0 to coincidence means 305 extinguish lamp means 307.

The foregoing indications may be extinguished by a manual operation of switch means 308. It is observed that if switch means 308 is depressed, an input terminal of NAND gate 304 is coupled to ground. This is equivalent to applying a binary 0 to the input terminal whereby NAND gate 304 produces a binary 1 at its output terminal. The binary 1 is intercoupled to NAND gate 303 which is now supplied with a binary 1 at each input terminal thereto. Consequently, NAND gate 303 supplies a binary 0 to coincidence means 305 which results in the de-energization of transistor means 306. Hence, transistor means 306 returns to its non-conducting state and the illumination of lamp means 307 is extinguished. Furthermore, the audible tone generated by the audio alarm circuit, not shown, is terminated. It is recognized that the output signal produced by NAND gate 303 may be switched to a binary 0 and the output signal produced by NAND gate 304 may be switched to a binary 1 if a binary 0 is applied to terminal 309. Terminal 309 is coupled to the facsimile transceiver such that the circuitry included in the facsimile transceiver applies a binary 0 to terminal 309 in response to a predetermined operator initiated action. For example, if the facsimile transceiver is similar to a Telecopier II or Telecopier III, a binary 0 is applied to terminal 309 when the facsimile "paper" door thereof is opened. Thus, it is seen that an indication of the completion of a facsimile transmission is obtained only in response to the energization and subsequent de-energization of the facsimile motor. The indication may be extinguished only as a consequence of operator initiated action or if a subsequent transmission obtains. Thus, if the data coupling apparatus in accordance with the present invention is operated to automatically receive a facsimile transmission, an indication of the completion thereof will be provided until the logic circuit illustrated in FIG. 3 is reset by an operator.

While the invention has been particularly shown and described with reference to a particular embodiment thereof, it will be obvious to those of ordinary skill in the art that the present invention admits of general application with any conventional data device. The use of the data coupling apparatus is not limited solely to a facsimile transceiver. Accordingly, any type of data may be transmitted between two subscribers over an existing communication channel such as, but not limited to, a leased telephone line, wherein each subscriber is provided with the data coupling apparatus of the present invention.

It is further recognized that the present invention is not limited to the particular circuit components described and illustrated herein. Accordingly, the coincidence means may comprise AND gates, NAND gates or the like. In addition, flip-flop means may be any conventional bistable circuit device. Furthermore, oscillating means 212 and timing means 226 may be modified as aforedescribed. Moreover, each of lamp means 219 and 307 may be combined with associated switch means 215 and 308, respectively, in a common unitary structure well known to the prior art. Therefore, the foregoing and various other changes and modifications in form and details may be made without departing from the spirit and scope of the invention. Consequently, it is intended that the appended claims be interpreted as including all such changes and modifications.

What is claimed is:

1. Apparatus for coupling a local data device to a communication channel whereby said local data device is adapted to selectively transmit data to and receive data from a remote data device, comprising:

data transmit means interconnected between said local data device and said communication channel providing a transmission path between said local data device and said communication channel for the transmission of data from said local data device;

data receive means interconnected between said communication channel and said local data device for providing a receiving path between said communication channel and said local data device for the reception of data by said local data device;

status detecting means coupled to said local data device and said data receive means for detecting the readiness of said local data device and said remote data device, respectively, to selectively transmit and receive data, said status detecting means including means for generating a signal in response to the readiness of said local data device to receive data and means for applying said signal to said data transmit means whereby said signal is transmitted to said remote data device for apprising said remote data device of the readiness of said local data device to receive data; and enable means coupled to said status detecting means for enabling said local data device to selectively transmit and receive data in accordance with the readiness of said local data device and said remote data device detected by said status detecting means.

2. The apparatus of claim 1 in which said status detecting means include means for sensing when said local data device or said remote data device admits of an active state representative of a data transmission, said last-mentioned sensing means including, data detecting means coupled to said data receive means for sensing a characteristic data signal transmitted by said remote data device;

means coupled to said local data device for receiving a signal therefrom when said local data device admits of an operating state; and inhibit means coupled to said data detecting means and said last-mentioned means and selectively responsive to said sensed characteristic data signal and said received signal for inhibiting the generation of said signal indicating readiness of said local data device to receive data.

3. The apparatus of claim 2 in which said status detecting means further includes means for sensing a further signal transmitted by said remote data device when said remote data device admits of readiness thereof to receive data; and said apparatus further including indicating means coupled to said signal generating means and said further signal sensing means for providing a first indication of when said local data device admits of said state of readiness to receive data, a second indication when said remote data device admits of said state of readiness thereof to receive data, a third indication when said local data device admits of said active state and a fourth indication when said remote data device admits of said active state.

4. The appratus of claim 3 wherein said indicating means comprises:

visual indicating means;

energizing means coupled to said visual indicating means and selectively responsive to said signal, said further signal and said signal received from said local data device for energizing said visual indicating means; and manually operable switch means for selectively coupling said signal and further signal to said energizing means.

5. The apparatus of claim 4 further including:

additional lamp means for providing a visual indication of the termination of a data transmission;

activating means coupled to said detecting means for actuating said additional lamp means upon detecting the termination of a data communication; and manually operable means for de-activating said additional lamp means in response to the manual operation thereof.

6. The apparatus of claim 2 wherein said enable means comprises:

receive enabling means for producing a receive enable signal when said remote data device transmits said characteristic data signal and said local data device admits of said state of readiness to receive data;

transmit enabling means for producing a transmit enable signal when said remote data device admits of said state of readiness to receive data and said local data device admits of a second state representative of the readiness of said local data device to transmit data; and means for selectively applying said receive enable signal and said transmit enable signal to said local data device to initiate the operation of said local data device and for removing said applied enable signal at the conclusion of a data transmission.

7. The apparatus of claim 6 wherein said means for selectively applying and for removing comprises:

storage means for selectively storing said receive and transmit enable signals;

means coupled to said receive and transmit enabling means for selectively supplying said storage means with said receive and transmit enable signals; and reset means for clearing said selectively stored receive and transmit enable signals from said storage means.

8. The apparatus of claim 7 wherein said reset means comprises:

first reset signal generating means for generating a first reset signal at a first predetermined period of time subsequent to the completion of a data reception by said local data device;

second reset signal generating means for generating a second reset signal at a second predetermined period of time subsequent to the completion of a data transmission by said local data device; and means coupled to said first and second reset signal generating means for selectively applying said first and second reset signals to said storage means.

9. Apparatus for coupling a local data device to a communication channel whereby said local data device is adapted to selectively transmit data to and receive data from a remote data device, comprising:

data transmit means interconnected between said local data device and said communication channel for providing a transmission path between said local data device and said communication channel for the transmission of data from said local data device;

data receive means interconnected between said communication channel and said local data device for providing a receiving path between said communication channel and said local data device for the reception of data by said local data device;

status detecting means coupled to said local data device and said data receive means for detecting the capacility of said local data device and said remote data device, respectively, to selectively transmit and receive data;

enable means coupled to said status detecting means for enabling said local data device to selectively transmit and receive data in accordance with the capability detected by said status detecting means said enable means comprising:

receive enabling means for producing a receive enable signal when said remote data device transmits a signal characteristic of data and said local data device admits of a first state of readiness to receive data;

transmit enabling means for producing a transmit enable signal when said remote data device admits of said first state and said local data device admits of a second state representative of the readiness of said local data device to transmit data and means for selectively applying said receive enable signal and said transmit enable signal to said local data device to initiate the operation of said local data device and for removing said applied enable signal at the conclusion of a data transmission.

10. The apparatus of claim 9 wherein said means for selectively applying and for removing comprises:

storage means for selectively storing said receive and transmit enable signals;

means coupled to said receive and transmit enabling means for selectively supplying said storage means with said receive and transmit enable signals; and reset means for clearing said selectively stored receive and transmit enable signals from said storage means.

11. The apparatus of claim 10 wherein said reset means comprises:

first resit signal generating means for generating a first reset signal at a first predetermined period of time subsequent to the completion of a data reception by said local data device;

second reset signal generating means for generating a second reset signal at a second predetermined period of time subsequent to the completion of a data transmission by said local data device; and means coupled to said first and second reset signal generating means for selectively applying said first and second reset signals to said storage means.

* * * * *